(12) United States Patent
Koulakiotis et al.

(10) Patent No.: US 11,153,871 B2
(45) Date of Patent: *Oct. 19, 2021

(54) NETWORK ELEMENT AND METHOD OF COMMUNICATING USING A PLURALITY OF CONTROLS CHANNELS MODULES

(71) Applicant: Sony Corporation, Tokyo (JP)

(72) Inventors: Dimitris Koulakiotis, Basingstoke (GB); Hideji Wakabayashi, Basingstoke (GB); Matthew William Webb, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 95 days.

This patent is subject to a terminal disclaimer.

(21) Appl. No.: 16/430,392

(22) Filed: Jun. 3, 2019

(65) Prior Publication Data

US 2019/0289600 A1  Sep. 19, 2019

Related U.S. Application Data

(63) Continuation of application No. 15/031,133, filed as application No. PCT/EP2014/072574 on Oct. 21, 2014, now Pat. No. 10,321,456.

(30) Foreign Application Priority Data

Oct. 31, 2013 (EP) .................................... 13191208

(51) Int. Cl.
*H04W 72/04* (2009.01)
*H04W 4/00* (2018.01)
(Continued)

(52) U.S. Cl.
CPC .......... *H04W 72/0446* (2013.01); *H04B 1/02* (2013.01); *H04B 1/06* (2013.01);
(Continued)

(58) Field of Classification Search
CPC ... H04L 5/0094; H04L 5/0053; H04L 5/0073; H04W 72/042; H04W 72/0453;
(Continued)

(56) References Cited

U.S. PATENT DOCUMENTS 9,198,181 B2 * 11/2015 Blankenship ......... H04L 5/0039
9,265,040 B2    2/2016 Dinan
(Continued)

FOREIGN PATENT DOCUMENTS

GB    2487757 A    8/2012
GB    2487780 A    8/2012
(Continued)

OTHER PUBLICATIONS

Stefan Parkvall, et al, "Heterogeneous network deployments in LTE", Ericsson Review, The Soft-Cell Approach, vol. 2, Total 5 pages, (2011).

(Continued)

*Primary Examiner* — Ahmed Elallam
(74) *Attorney, Agent, or Firm* — Xsensus LLP

(57) ABSTRACT

A network element forming a mobile communications network, and configured to provide a wireless access interface to one or more communications devices and to transmit downlink data to and receive uplink data from the communications devices via the wireless access interface. The downlink resources extend across a predetermined bandwidth and are time divided into plural timeframes. The network element includes a transmitter, and controller configured to control the transmitter to transmit control data to the communications devices in resources of a control channel formed from plural control channel modules formed from only part of the predetermined bandwidth and mutually exclusive from parts of the predetermined bandwidth from which the other control channel modules are formed. The (Continued)

plural control channel modules allow the control channel to be varied in bandwidth and adapted to the structure of the communications network, the communications devices being served and traffic conditions in the communications network.

20 Claims, 13 Drawing Sheets

(51) Int. Cl.
 H04B 1/02 (2006.01)
 H04B 1/06 (2006.01)
 H04L 5/00 (2006.01)
 H04W 4/70 (2018.01)
(52) U.S. Cl.
 CPC ............ *H04L 5/0053* (2013.01); *H04W 4/70* (2018.02); *H04W 72/042* (2013.01)
(58) Field of Classification Search
 CPC . H04W 4/70; H04W 72/044; H04W 72/0446; H04W 72/048; H04W 72/04; H04W 72/0406; H04W 4/02; H04W 72/12; H04W 74/006; H04W 72/1205; H04W 72/1252; H04W 72/1289; H04B 1/02; H04B 1/06
 See application file for complete search history.

(56) References Cited

U.S. PATENT DOCUMENTS

| | | | |
|---|---|---|---|
| 9,288,786 B2* | 3/2016 | Morioka | H04W 72/005 |
| 9,432,973 B2 | 8/2016 | Tang et al. | |
| 9,510,132 B2* | 11/2016 | Xu | H04W 72/042 |
| 9,526,068 B2 | 12/2016 | Webb et al. | |
| 9,596,069 B2* | 3/2017 | Khoryaev | H04L 5/0094 |
| 9,628,236 B2 | 4/2017 | Takeda et al. | |
| 9,705,654 B2 | 7/2017 | Ahmadi | |
| 9,749,771 B2* | 8/2017 | Xu | H04W 4/70 |
| 9,871,636 B2* | 1/2018 | Chen | H04L 5/0094 |
| 9,872,123 B2 | 1/2018 | Webb et al. | |
| 9,967,869 B2 | 5/2018 | Darwood et al. | |
| 10,009,163 B2 | 6/2018 | Shimezawa et al. | |
| 10,117,238 B2 | 10/2018 | Morioka | |
| 10,182,434 B2* | 1/2019 | Webb | H04W 48/12 |
| 10,554,376 B2* | 2/2020 | Song | H04W 72/042 |
| 11,032,802 B2* | 6/2021 | Webb | A63H 33/086 |
| 2005/0120097 A1 | 6/2005 | Walton et al. | |
| 2011/0249633 A1 | 10/2011 | Hong et al. | |
| 2011/0268046 A1 | 11/2011 | Choi et al. | |
| 2013/0064196 A1* | 3/2013 | Gao | H04L 5/0053 370/329 |
| 2013/0077597 A1 | 3/2013 | Nukala et al. | |
| 2013/0114587 A1 | 5/2013 | Khoryaev et al. | |
| 2013/0142142 A1 | 6/2013 | McBeath et al. | |
| 2013/0223402 A1 | 8/2013 | Feng et al. | |
| 2013/0242882 A1* | 9/2013 | Blankenship | H04L 5/0041 370/329 |
| 2013/0272215 A1 | 10/2013 | Khoryaev et al. | |
| 2013/0301552 A1* | 11/2013 | Xu | H04W 72/042 370/329 |
| 2014/0011506 A1 | 1/2014 | McNamara et al. | |
| 2014/0044090 A1 | 2/2014 | Beale | |
| 2014/0050192 A1 | 2/2014 | Kim et al. | |
| 2014/0056279 A1 | 2/2014 | Chen et al. | |
| 2014/0126487 A1 | 5/2014 | Chen et al. | |
| 2015/0139149 A1 | 5/2015 | Feng et al. | |
| 2015/0215915 A1 | 7/2015 | Boudreau et al. | |
| 2015/0245324 A1 | 8/2015 | Kim et al. | |
| 2015/0296514 A1 | 10/2015 | Morioka et al. | |
| 2015/0304080 A1 | 10/2015 | Yi et al. | |
| 2017/0280273 A1 | 9/2017 | Xu et al. | |
| 2017/0353281 A1 | 12/2017 | Ahmadi | |
| 2020/0351035 A1* | 11/2020 | Li | H04L 1/1896 |

FOREIGN PATENT DOCUMENTS

| | | |
|---|---|---|
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| WO | 2012/104631 A1 | 8/2012 |
| WO | 2013/045900 A1 | 4/2013 |

OTHER PUBLICATIONS

International Search Report dated Feb. 5, 2015 in PCT/EP14/072574 Filed Oct. 21, 2014.
Office Action dated Jan. 24, 2018 in corresponding European Patent Application No. 14 787 165.1, 5 pages.

* cited by examiner

NETWORK ELEMENT AND METHOD OF COMMUNICATING USING A PLURALITY OF CONTROLS CHANNELS MODULES

CROSS-REFERENCE TO RELATED APPLICATIONS

The present application is a Continuation application of U.S. application Ser. No. 15/031,133, filed Apr. 21, 2016, which is based on PCT filing PCT/EP2014/072574 filed Oct. 21, 2014, and claims priority to European Patent Application 13 191 208.1, filed in the European Patent Office on Oct. 31, 2013, the entire contents of each of which being incorporated herein.

FIELD OF THE DISCLOSURE

The present disclosure relates to network elements for forming part of mobile communications networks, communications systems, communications devices and methods of communicating data via a wireless access interface provided by a mobile communications network.

BACKGROUND OF THE DISCLOSURE

Third as well as fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy on high data rate applications such as video streaming and video conferencing on mobile communications devices that would previously only have been available via a fixed line data connection. The demand to deploy fourth generation networks is therefore strong and the coverage area of these networks, i.e. geographic locations where access to the networks is possible, is expected to increase rapidly.

The anticipated widespread deployment of fourth generation networks has led to the parallel development of a class of communications devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices communicating small amounts of data on a relatively infrequent basis. Examples include so-called smart meters which, for example, are located in a customer's house and periodically transmit information relating to the customers consumption of a utility such as gas, water, electricity and so on.

The variety of devices anticipated to operate in LTE systems have a range of different usage requirements and therefore it would be beneficial if LTE systems are able to provide a wireless access interface which can be tailored to the requirements of the different classes of devices. For example, high bandwidth devices such as smartphones and tablets may benefit from a wireless access interface with a high capacity whereas MTC devices may benefit from a reduced complexity lower capacity wireless access interface with a capability to transmit small amounts of data more efficiently, since lower complexity typically implies lower device cost. A number of approaches currently exist to address these problems, for example, by providing a heterogeneous communication network where a number of low-power nodes provide additional coverage within a coverage area of a high-power umbrella or macro node, system capacity may be increased. Alternatively, for MTC devices a virtual carrier approach has been proposed where a reduced bandwidth segment of the wireless access interface is reserved for use by MTC devices thus allowing these devices to transmit and receive data over a reduced bandwidth and in turn lowering their complexity and cost.

However, although these approaches each provide a wireless access interface tailored to different classes of device, the complexity of the resource allocation associated is potentially complex and may lead to increased control signalling overheads.

SUMMARY OF THE DISCLOSURE

According to an example embodiment of the present disclosure there is provided a network element for forming a mobile communications network, the network element configured to provide a wireless access interface to one or more communications devices and to transmit downlink data to and receive uplink data from the one or more communications devices via the wireless access interface. The downlink resources of the wireless access interface extending across a predetermined bandwidth and being divided in time into a plurality of timeframes. The network element comprising a transmitter and a controller, the controller being configured to control the transmitter to transmit control data to the communications devices in resources of a control channel, wherein the control channel is formed a plurality of control channel modules, each control channel module being formed from a part of the predetermined bandwidth, each of the parts of the predetermined bandwidth from which each of the control channels is formed being smaller than the predetermined bandwidth and mutually exclusive from the parts of the predetermined bandwidth from which the other control channel modules are formed.

Providing a control channel formed from a plurality of control channel modules allows different portions of the control channel to be allocated to different network elements in a heterogeneous network or different communications devices. This allocation may then reduce the need for communications devices to receive the entirety or a significant portion of data within the control channel, thus increasing the efficiency and flexibility of resource allocation. The potentially reduced size of the control channel compared to the predetermined bandwidth of the wireless access interface also provides spare bandwidth, which instead of being occupied by the control channel can be used for the provision of additional services. Furthermore, physical downlink control channel (PDDCH) information may be contained within a single control channel module such that PDDCH information can be detected and decoded without receiving signals from across the entirety of the predetermined bandwidth.

In one example embodiment each of the control channel modules has a substantially equal time duration within the frame. Providing the control channel modules with a single duration allows a single indication of module duration to be provided instead of a separate indication for each control channel module, thus conserving capacity in the system In one example each of the control channel modules having unequal time durations within the frame.

Providing the control channel modules with unequal durations allows the resources dedicated to the control channel to be more flexibility allocated, thus potential improving the efficiency of the system.

In one example the network element is configured to provide the wireless access interface to communication devices within a first geographical area, and the controller is configured to control the transmitter to transmit control data to the communications devices within the first geographical area in one of the plurality of control channel modules.

Providing a plurality of control channel modules allows different nodes in a decoupled network to be allocated different control channel modules such that communications devices receive control data in a control channel module which corresponds to the coverage area in which they are currently located. This may therefore reduce the volume of control data that communications devices are required to receive.

In one example embodiment the bandwidth of the control channel is less than the predetermined bandwidth, such that a difference in the bandwidth between the control channel and the predetermined bandwidth provides a bandwidth gap, wherein the controller is configured to control the transmitter to provide a narrowband virtual carrier in the bandwidth gap.

The provision of a bandwidth gap allows additional services to be provided to communications devices anywhere in the predetermined system bandwidth where control data would conventionally be situated. The bandwidth gap may also be utilised to reduce and or avoid interface thus also increasing the robustness of the wireless access interface.

The provision of a narrowband virtual carrier in the bandwidth gaps allows narrowband devices such as MTC devices to operate within the predetermined system bandwidth without disrupting the allocation of control channel resources to conventional communications devices.

In one example embodiment the controller is configured to allocate each of the control channel modules to communications devices in dependence upon an identity of each of the communications devices.

The allocation of control channel modules based on the identity of the communication devices identity enables a communications device to calculate the allocation of control channel resources without having to receive an explicit indication control channel resource allocation.

In one example embodiment the controller is configured to control the transmitter to provide in a predetermined control module an indication of the bandwidth and location of the plurality control channel modules.

The provision of a predetermined control channel module enables communications devices to obtain an indication of the structure of the control channel without having to receive control channel data across the entirety or a substantial portion of the control channel bandwidth.

Various further aspects and embodiments of the disclosure are provided in the appended claims, including but not limited to a communications system, a communications device and a method of communicating.

BRIEF DESCRIPTION OF THE DRAWINGS

Embodiments of the present disclosure will now be described by way of example only with reference to the accompanying drawing in which like parts are provided with corresponding reference numerals and in which.

DETAILED DESCRIPTION OF EXAMPLE EMBODIMENTS

Conventional Network

Figure 1:
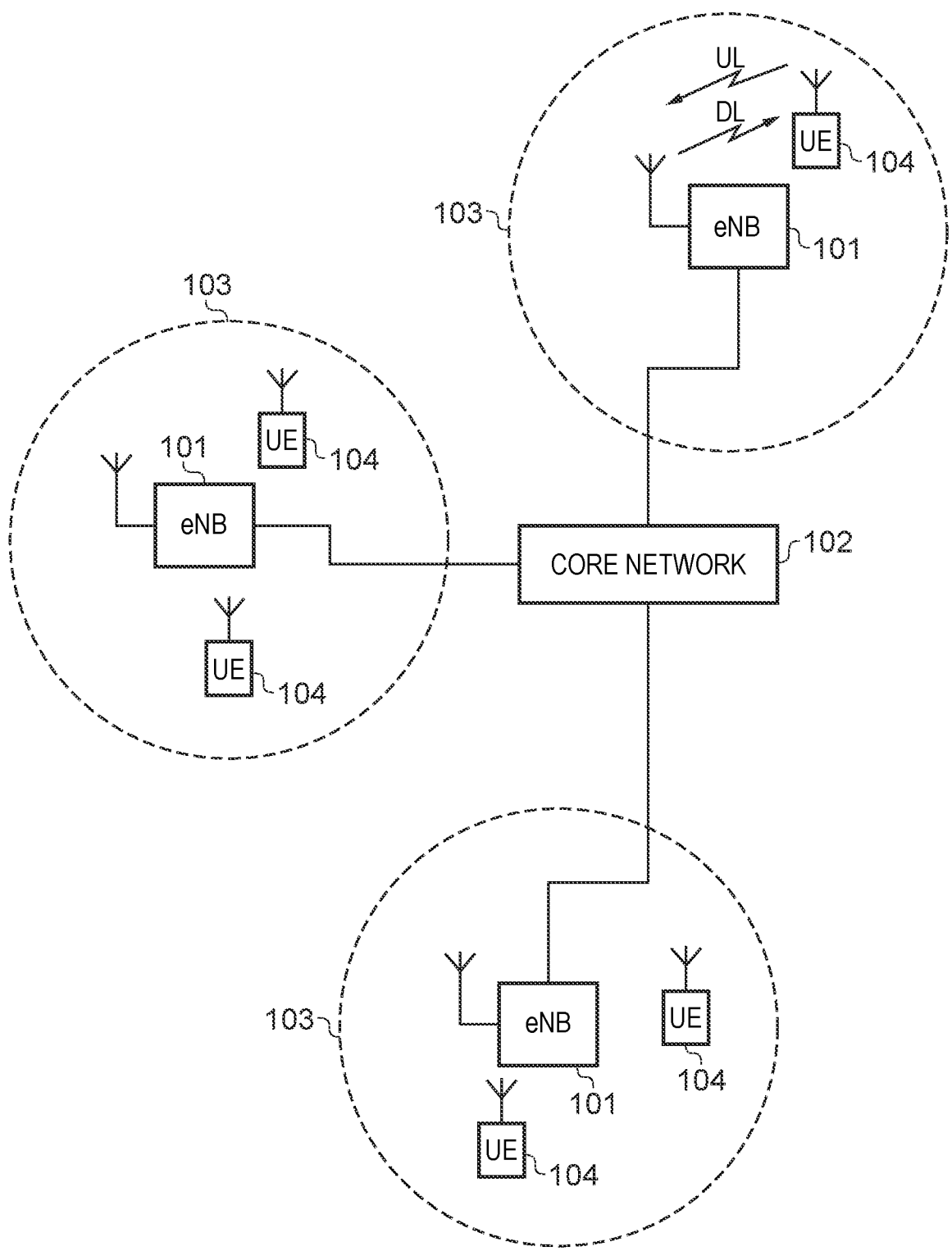
FIG. 1 provides a schematic diagram of a communications network.

FIG. 1 provides a schematic diagram illustrating the basic functionality of a conventional mobile telecommunications network. The network includes a plurality of base stations 101 connected to a core network 102. Each base station provides a wireless access interface to a respective coverage area 103 (i.e. a cell) within which data can be communicated to and from mobile terminals 104 via the wireless access interface provided by the respective base station. Data is transmitted from a base station 101 to a mobile terminal 104 within a coverage area 103 via a radio downlink. Data is transmitted from a mobile terminal 104 to a base station 101 via a radio uplink. The core network 102 routes data to and from the mobile terminals 104 and provides functions such as authentication, mobility management, charging and so on. A mobile terminal may also be referred to as user equipment (UE) or a communications device and a base station as an enhanced node B (eNodeB) or network element.

Figure 2:
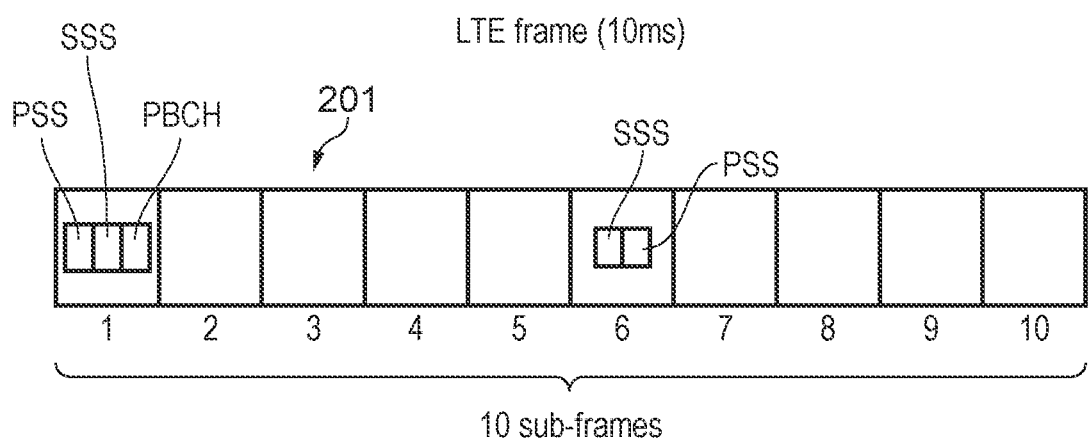
FIG. 2 provides a schematic diagram of an example conventional LTE radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single-carrier frequency division multiple access based interface for the radio uplink (so-called SC-FDMA). Data is transmitted on the uplink and on the downlink on a plurality of orthogonal subcarriers. FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is located in the first subframe of the LTE frame. The PSS, SSS and PBCH are discussed in more detail below.

Figure 3:
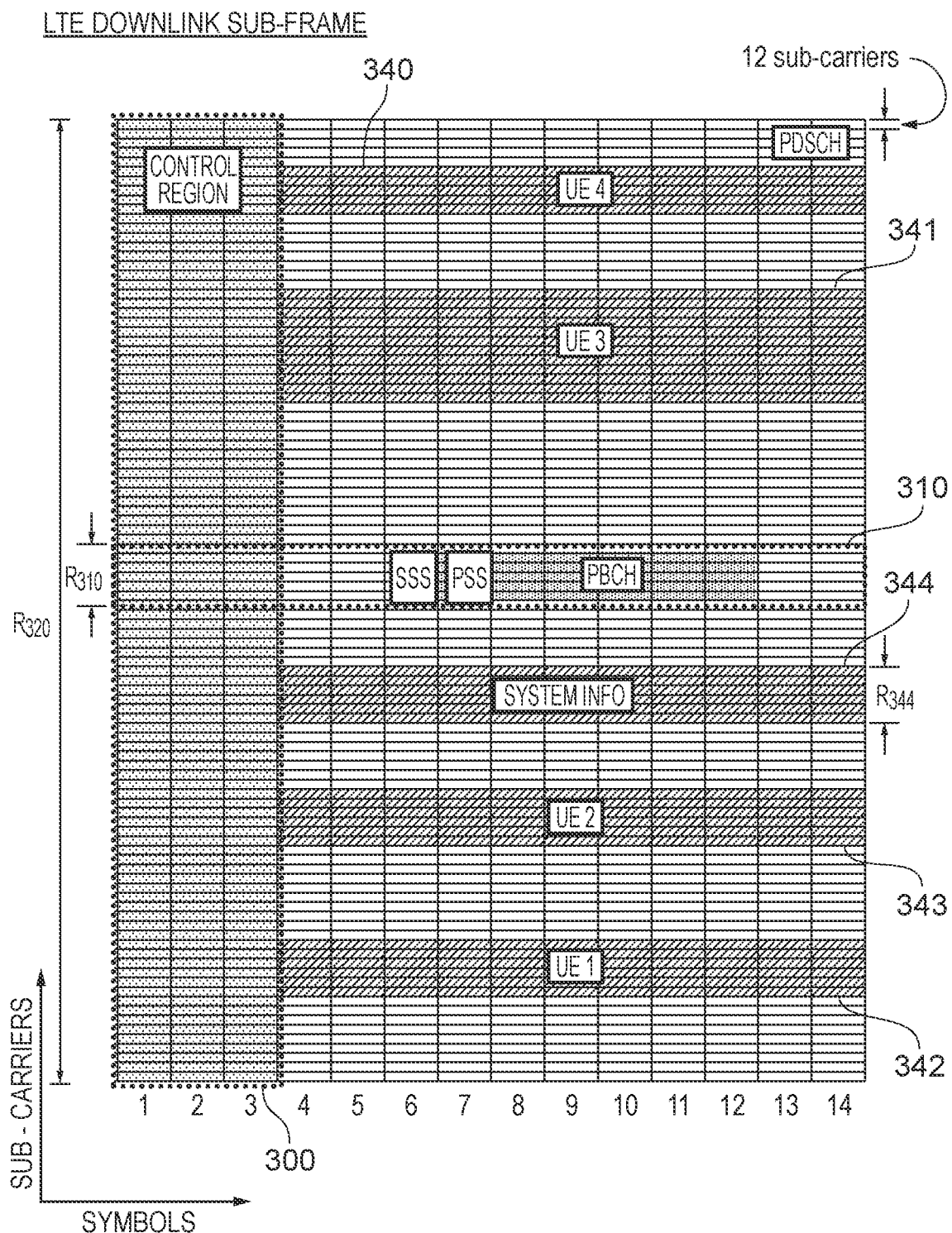
FIG. 3 provides a schematic diagram of an example conventional LTE subframe.

FIG. 3 provides a schematic diagram providing a grid which illustrates the structure of an example of a conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier. The example subframe shown in FIG. 3 comprises 14 symbols and 1200 subcarriers spaced across a 20 MHz bandwidth. The smallest unit on which data can be transmitted in LTE is twelve subcarriers transmitted over one subframe. For clarity, in FIG. 3, each individual resource element is not shown, instead each individual box in the subframe grid corresponds to twelve subcarriers transmitted on one symbol. FIG. 3 shows resource allocations for four UEs 340, 341, 342, 343 where within these resource allocations signals representing user data are transmitted from the eNodeB to the UEs. For example, the resource allocation 342 for UE 1 extends over five blocks of twelve subcarriers, the resource allocation 343 for a second UE 2 extends over six blocks of twelve subcarriers and so on.

Signals representing control data are transmitted in a control region 300 of the subframe comprising the first n symbols of the subframe where n can vary between one and three symbols for channel bandwidths of more than 1.4 MHz and where n can vary between two and four symbols for channel bandwidths of up to and including 1.4 MHz. The control region 300 includes a control channel which spans the control region and in which data is transmitted on one or more physical downlink control channels (PDCCH), the physical control format indicator channel (PCFICH) and the physical HARQ indicator channel (PHICH).

A PDCCH may contain control data common to all UEs or control data specific to one or more UEs. The control data may comprise information to control relevant UEs but also information to indicate which subcarriers on which symbols of the subframe have been allocated to data for UEs. Each PDDCH conveys one instance of a downlink control information (DCI) and is interleaved across the control channel, therefore a receiver is required to receive signals from across the entire control region in order to decode data conveyed by a PDCCHs. For example, PDCCH data transmitted in the control region 300 of the subframe shown in FIG. 3 would indicate that UE1 has been allocated the first block of resources 342, that UE2 has been allocated the second block of resources 343, and so on. In subframes where it is transmitted, the PCFICH contains control data indicating the duration of the control region in that subframe (i.e. between one and four symbols) and the PHICH contains HARQ (Hybrid Automatic Request) data indicating whether or not previously transmitted uplink data has been successfully received by the network.

In certain subframes, symbols in a central band 310 of the subcarriers are used for the transmission of information including the PSS, the SSS and the PBCH mentioned above. This central band 310 is typically 72 subcarriers wide (corresponding to a transmission bandwidth of 1.08 MHz). The PSS and SSS are synchronisation sequences that once detected allow a communications terminal 104 to achieve frame synchronisation and determine the cell identity of the eNodeB transmitting the downlink signal. The PBCH carries information about the cell, comprising a master information block (MIB) that includes parameters that the communications terminals require to access the cell. The data transmitted to individual communications terminals on the physical downlink shared channel (PDSCH) can be transmitted in the remaining blocks of communications resource elements of the subframe.

FIG. 3 also shows a region of PDSCH containing system information and extending over a bandwidth of $R_{344}$. Thus in FIG. 3 the central frequency carries control channels such as the PSS, SSS and PBCH and therefore implies a minimum bandwidth of a receiver of a communications terminal.

The number of subcarriers in an LTE channel can vary depending on the configuration of the transmission network. Typically this variation is from 72 sub carriers contained within a 1.4 MHz channel bandwidth to 1200 subcarriers contained within a 20 MHz channel bandwidth as shown in FIG. 3. As is known in the art, subcarriers carrying data transmitted on the PDCCHs, PCFICH and PHICH are typically distributed across the entire bandwidth of the subframe. Therefore a conventional communications terminal must be able to receive the entire bandwidth of the subframe in order to receive and decode the control region.

Figure 4:
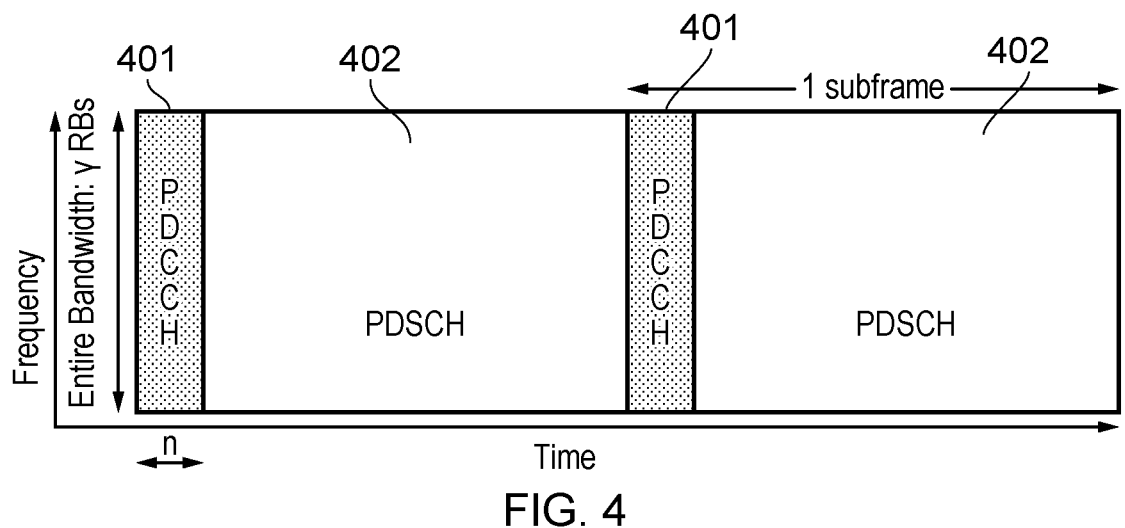
FIG. 4 provides a schematic diagram of two example conventional LTE subframes.

FIG. 4 provides a simplified diagram of a downlink subframe where a control channel and the PDSCH are shown. In FIG. 4, each subframe has a single PDDCH 401 in the control channel which spans a predetermined time period represented by n OFDM symbols and a PDSCH 402 which spans substantially the entire system bandwidth represented by y resource blocks. The form of subframe in FIG. 4 is primarily designed for systems where there is a central eNodeB and both user data and control data are transmitted and received in the uplink and downlink by the eNodeB. However, restricting a system to operate in this manner may limit the flexibility and achievable data rates in the system. For example, due to the limited transmission power at a UE, it may be beneficial for the UE to transmit data to a local low-power node which then communicates the data to the central eNodeB but still receive control data directly from the high-power serving eNodeB. Furthermore, the low-power node may also transmit downlink user data to the UE thus relieving the central eNodeB of this task.

Figure 5:
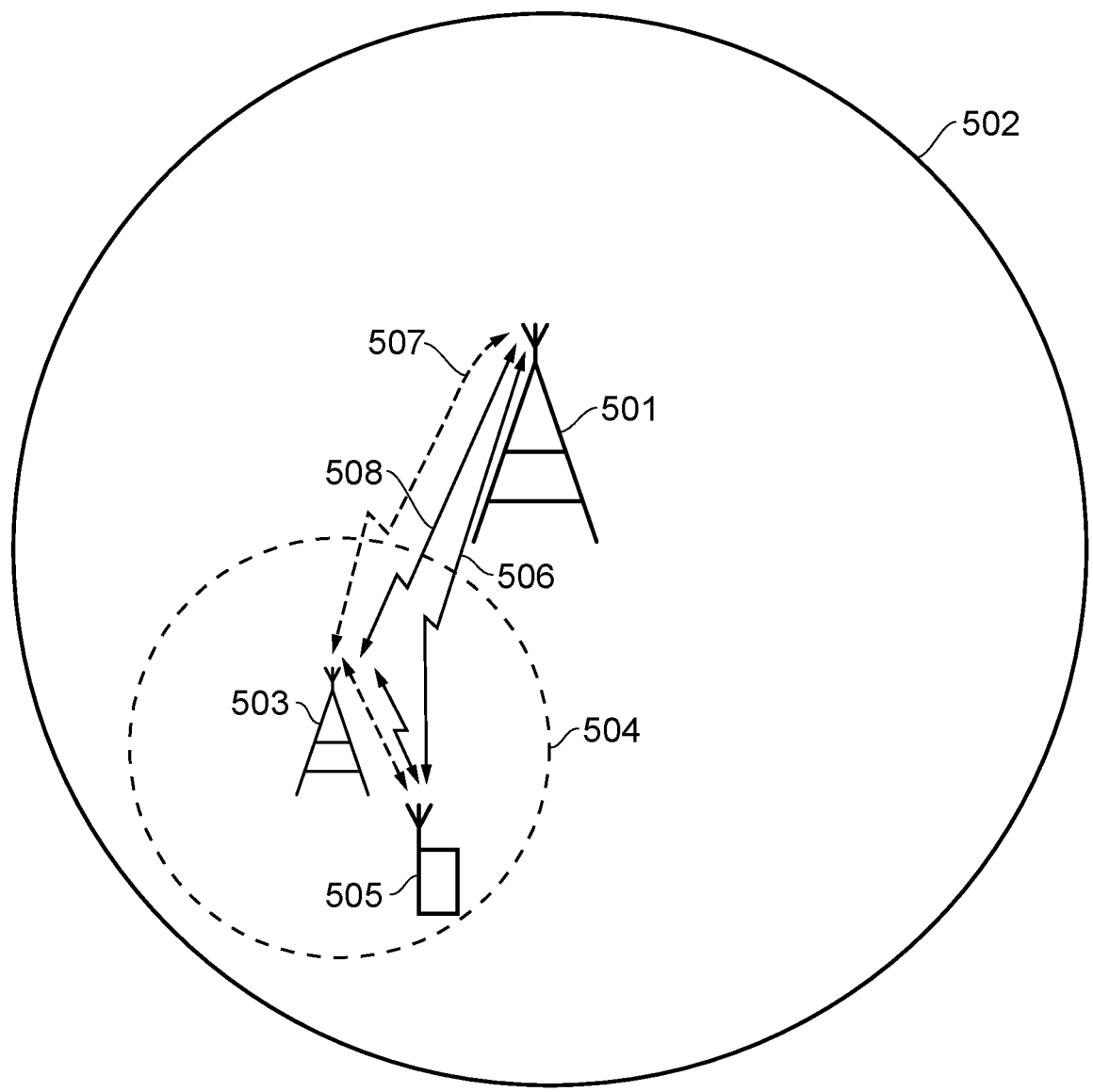
FIG. 5 provides a schematic diagram of an example heterogeneous communications network.

FIG. 5 provides a diagram of an example system where a first high-power eNodeB 501 provides a first coverage area 502 and a second low-power node 503 provides a second coverage area 504 which is smaller than and within the first coverage area 502. The node 502 may also be referred to as an umbrella or macro node and node 503 as a local or low-power node where the macro node provides coverage between the areas served by the local low-power nodes. The UE 505 is within both the first and second coverage areas and therefore is capable of communicating with both the central eNodeB 501 and the lower power node 503. A proportion of the control signalling is centrally transmitted from the eNodeB 501 to the UE, this signalling is common control signalling which multiple UEs in the cell 502 are required to receive and is represented by arrow 506. UE specific control signal is transmitted locally from the low power node 503 to the UE 505 and is represented by the dashed arrow 507 where the connection between the low-power node 503 and the eNodeB 501 may be provided by a backhaul connection. Although the macro node and the low-power node may transmit different control data, synchronisation signals broadcast signals and reference signals may stay the same between the macro node and the low-power node, for example PSS, SSS and PBCH signals may be common between the nodes. The UE specific user data is also transmitted locally from the low-power node and is represented by arrow 508 where once again the connection between the low-power node 503 and the eNodeB 501 may be provided by a backhaul connection. This decoupled arrangement can be lead to increases in capacity as the eNodeB is not required to transmit all UE user data within the coverage area 502. Instead a proportion of the UE user data is transmitted by low power local nodes such as 503. However this increase in capacity can come at the cost of increased control signalling and coordination between nodes and therefore may lead to control signalling overload at the eNodeB. In some examples the structure of FIG. 5 may correspond to a heterogeneous network where the low-power node 503 may be referred to as a pico node or femto node. Pico or femto nodes may be placed in areas where there is particularly high demand in order to increase capacity to beyond the capacity that can be achieved with a single high-power node.

In accordance with the present disclosure a flexible control channel is provided which allows the control channel in LTE systems to be tailored to the structure of the cell or coverage area in which it is being used. This flexibility thus allows the control channel to be adapted such that the likelihood of control overload can be reduced and transmission of control data more evenly and efficiently distributed between serving eNodeBs and local lower power nodes. As described with reference to FIGS. 3 and 4, the existing control channel and the one or more PDCCHs contained therein can only be dimensioned in time i.e. can vary in duration from one to four OFDM symbols depending on the number of subcarriers being utilised in the system. In accordance with the present disclosure one or more control channel modules which form the control channel are provided and can be dimensioned in the frequency domain such that the control channel is not restricted to a single continuous region spanning substantially the entire bandwidth of the system as illustrated in FIGS. 3 and 4. The control channel modules may span mutually exclusive bandwidths and may allow one or more PDDCHs to be fully contained within a single control channel module such that PDDCHs may be received without receiving signals across the entire bandwidth of the control region. Furthermore, each control channel module is formed from part of the control region (i.e. predetermined system bandwidth) bandwidth, where the part of the system bandwidth which forms each control channel modules is smaller than the system bandwidth.

Figure 6:
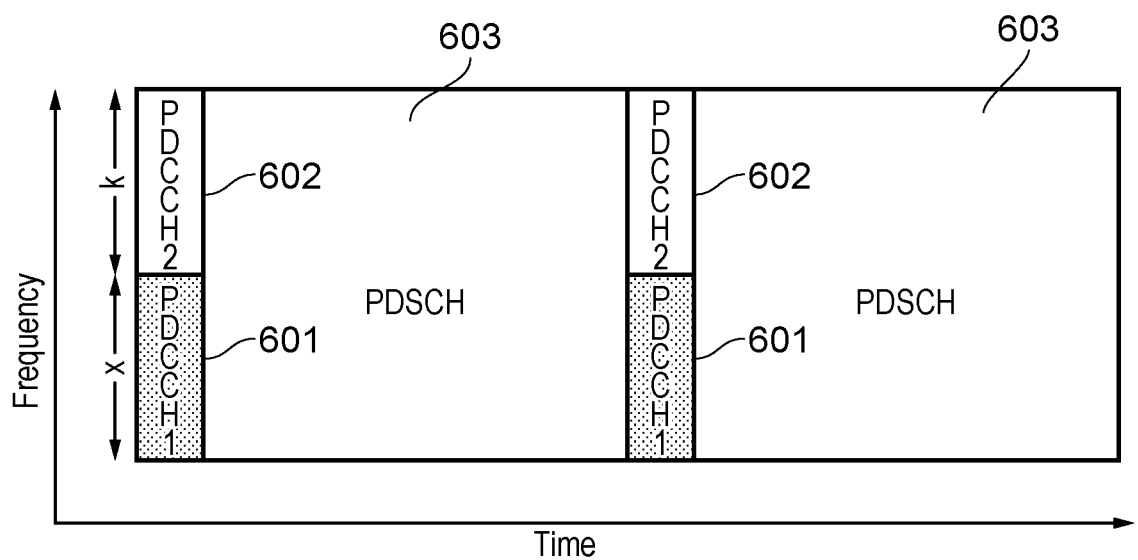
FIG. 6 provides a schematic diagram of two LTE subframes in accordance with an example of the present disclosure.

FIG. 6 provides a schematic diagram of a control channel structure in accordance with an example embodiment of the present disclosure, where each control channel module contains a single PDDCH. However, each control channel module may also contain more than one PDDCH. Instead of a single continuous control channel in which PDCCHs are located, the control channel is formed from one or more independent control channel modules, where in the subframes of FIG. 6 the control channel is formed from two control channel modules 601 and 602, each of which have a non-overlapping bandwidth less then the bandwidth of the system. These control channel modules may then be allocated to different nodes, for example an eNodeB and a low-power node as described with reference to FIG. 5. PDCCH data in each of the modules may then indicate the resources in the PDSCH 603 which have been allocated to the UE served by the nodes. Consequently, the PDCCH data may be received without receiving signals from across substantially the entire control region, in contrast to the case in existing LTE systems. Implementation of this flexible allocation may therefore require a revised mapping of resource elements to PDCCHs in the control modules compared to existing LTE control structures. The modular structure of the control channel allows the transmission of control data to be split between one or more nodes which may operate over same frequency so that the likelihood of control signalling overload at a node is reduced. This may be advantageous in heterogeneous networks where a single high power node is unable to provide sufficient capacity and a further node i.e. 503 has been introduced in order to increase capacity. The structure of the control channel may be dynamically controlled by the eNodeB so that it can be adapted to suit the current or expected traffic conditions of the network. For example, if a large number of devices within area 504 become active the size control channel module 602 which is allocated to low-power node 503 may be increased and the size of control channel module 601 decreased, thus providing more capacity for control data from the low-power node 503. In some examples, the different control channel modules may be allocated to different classes of devices, for instance module 601 may be allocated to high-bandwidth devices and 602 may be allocated to low-bandwidth devices.

In FIG. 6 the control channel modules 601 and 602 are each smaller in bandwidth that the bandwidth of the system (y resources blocks) but in total are approximately equal or equal to the system bandwidth. More specifically control channel module 601 spans a bandwidth of x resource blocks (12x subcarriers) and control channel module 602 spans k resource blocks (12k subcarriers), where y=x+k. The division of the conventional control channel bandwidth into a number of independent control channel modules may in some examples result in legacy devices being unable to operate with the newly prosed modular formation because of the non-contiguous nature of the proposed control channel and the fact that PDDCHs may no longer be interleaved over substantially the entire bandwidth of the system. However, this may be overcome by the eNodeB switching between the existing control channel structure and the proposed control channel structure, and signalling any such switching to UEs being served. The control channel modules may be of a single duration in time or their duration may vary with respect to each other. The duration and/or bandwidth of the control channel modules may be signalled in a module-specific PCFICH, signalled in a common PCFICH or be included in a commonly received default control channel module which is described in more detail below.

Figure 7:
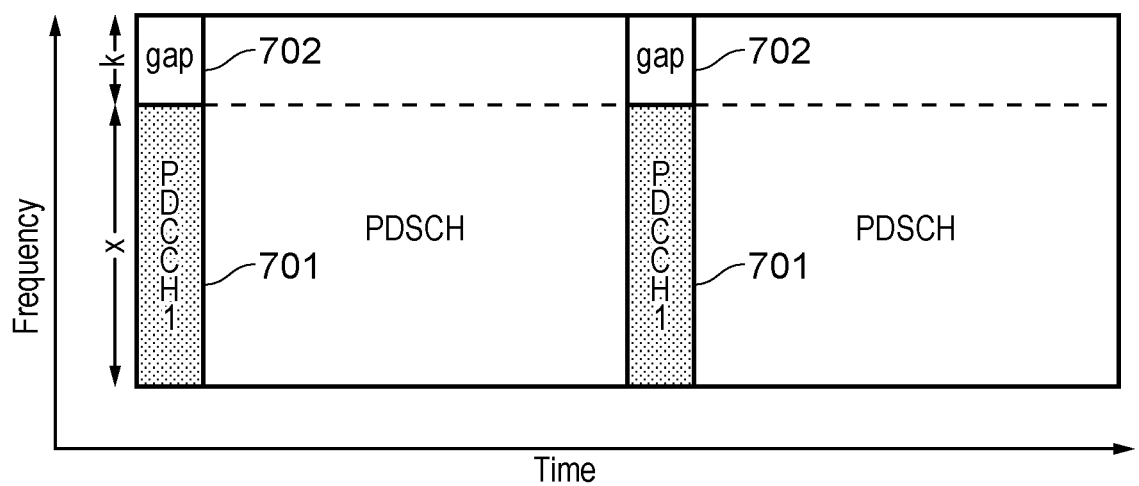
FIG. 7 provides a schematic diagram of two LTE subframes in accordance with an example of the present disclosure.

FIG. 7 provides a schematic diagram of a control channel structure in accordance with another example embodiment of the present disclosure. The control channel is formed from a single control channel module 701 which has a bandwidth of x resource blocks where x is less than the bandwidth y of the system and the single control channel module may act as a reduced bandwidth PDDCH. As a result of x<y there is a bandwidth gap 702 of width k resource blocks between the control channel formed from the channel module 701 and the predetermined bandwidth of the system. This bandwidth gap may have a number of applications, for instance in may be used to provide auxiliary services, be used to serve narrowband devices or used as a frequency notch in order to reduce interface to other co-existing systems or avoid interference caused by co-existing systems. Alternatively, if network traffic in a system is low the total bandwidth of the control channel can be reduced and therefore for the bandwidth gap increases so that UE is required to receive a smaller bandwidth, thus reducing power consumption.

Figure 8:
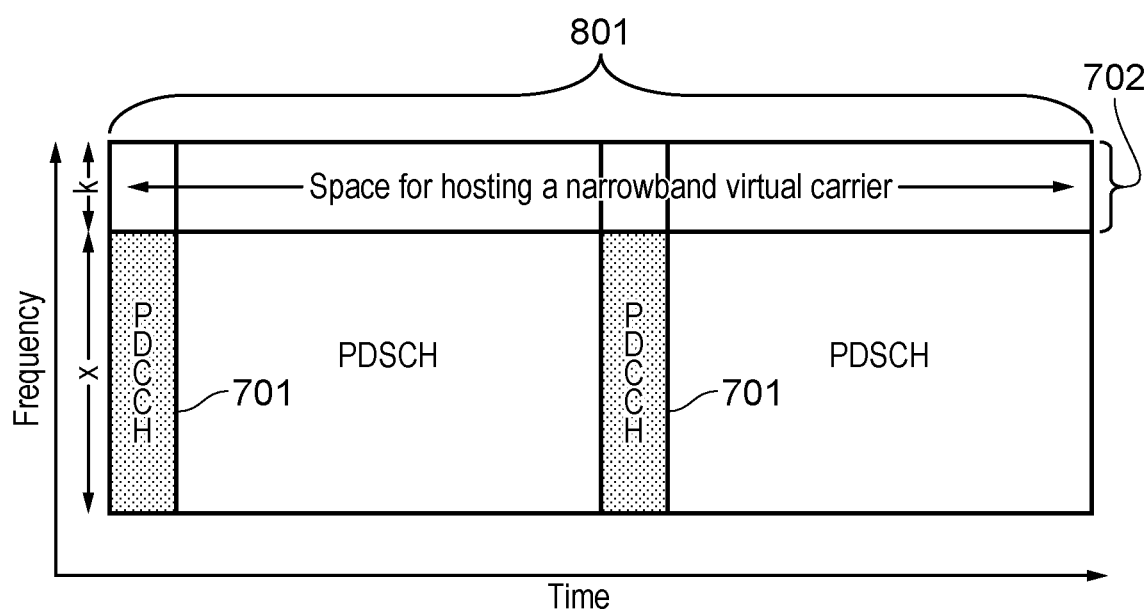
FIG. 8 provides a schematic diagram of two LTE subframes in accordance with an example of the present disclosure.

FIG. 8 provides a schematic diagram of a control channel structure where the bandwidth gap described with reference to FIG. 7 has been utilised to provide a narrowband virtual carrier 801. A virtual carrier is an existing technique directed towards serving low-cost and low-complexity devices such as machine-type communications (MTC) devices as described in a number of co-pending patent applications GB 1101970.0, GB 1101981.7, GB 1101966.8, GB 1101983.3, GB 1101853.8, GB 1101982.5, GB 1101980.9 and GB 1101972.6, the contents of which are incorporated herein by reference. The use of a narrowband virtual carrier reduces the required operational bandwidth of a device's receiver thus in turn reducing the cost of such devices. The use of virtual carriers with MTC devices allows these devices to operate alongside convention LTE devices, such as smartphones and tablets, with out requiring the same capabilities as conventional LTE devices. In order to implement the narrowband virtual carrier of FIG. 8, appropriate PDSCH scheduling will be required in order to ensure that conventional non-virtual carrier devices are not allocated PDSCH resources which fall within the virtual carrier bandwidth. Although in FIG. 8 the virtual carrier is positioned at the upper end of the predetermined system bandwidth it may be located at any point in the system bandwidth and in some examples more than one narrowband virtual carrier may be provided when one or more bandwidth gaps are provided.

Figure 9:
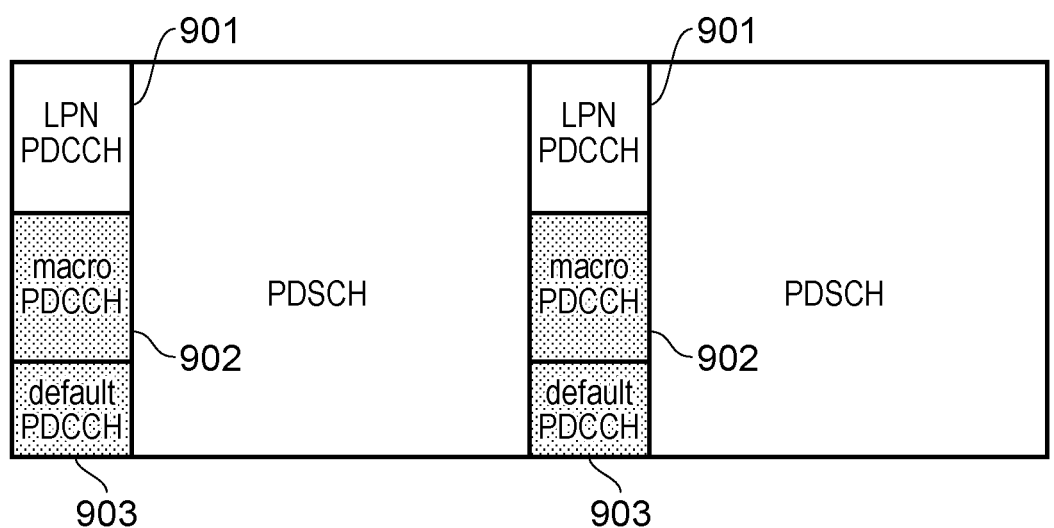
FIG. 9 provides a schematic diagram of two LTE subframes in accordance with an example of the present disclosure.

FIG. 9 provides a schematic diagram of an example embodiment of a modular control channel structure when a plurality of nodes are each allocated a control channel module. The structure of the control channel in FIG. 9 has been adapted for use in scenarios such as that illustrated in FIG. 5 but the structure may be adapted for use where there is a plurality of low-power nodes serving under a single macro node. The control channel is formed from three control channel modules 901, 902 and 903. The control channel module 901 is allocated to the low-power node 503 for transmission of control data specific to devices serving the low-power node 503 and the control channel module 902 is allocated to the macro or high-power eNodeB 501 for transmission of control data specific to devices served by the macro node 501. The default control channel module 903 is allocated for transmission of control channel data required by all devices and may provide control information common to the macro cell and the small cell. Initially when a UE attempts to connect to the cell it will decode the default control information transmitted in control channel module 903, the default control information indicating for example the location and size of the other control channel modules and their relationship with the nodes 501 and 503. The UE will then subsequently decode the control information in the appropriate control channel module, for example module 901 if in area 501 or 903 if in area 504. The default control channel module 903 is likely to be transmitted by high-power node 501 such that it can be received by UEs throughout the cell area 502 but in some examples it may be transmitted by the low-power node 503. The modular arrangement illustrated in FIG. 9 advantageously reduces the volume of scheduling data the node 501 is required to transmit and therefore reduces the likelihood that the node 501 encounters a control data overload. Common search space downlink control information may be provided in the macro control channel module 903 and UE-specific search space downlink control information provided in the macro control channel 903 or the low-power nodes control channel module 902 depending on the node serving a UE with downlink user data.

Figure 10:
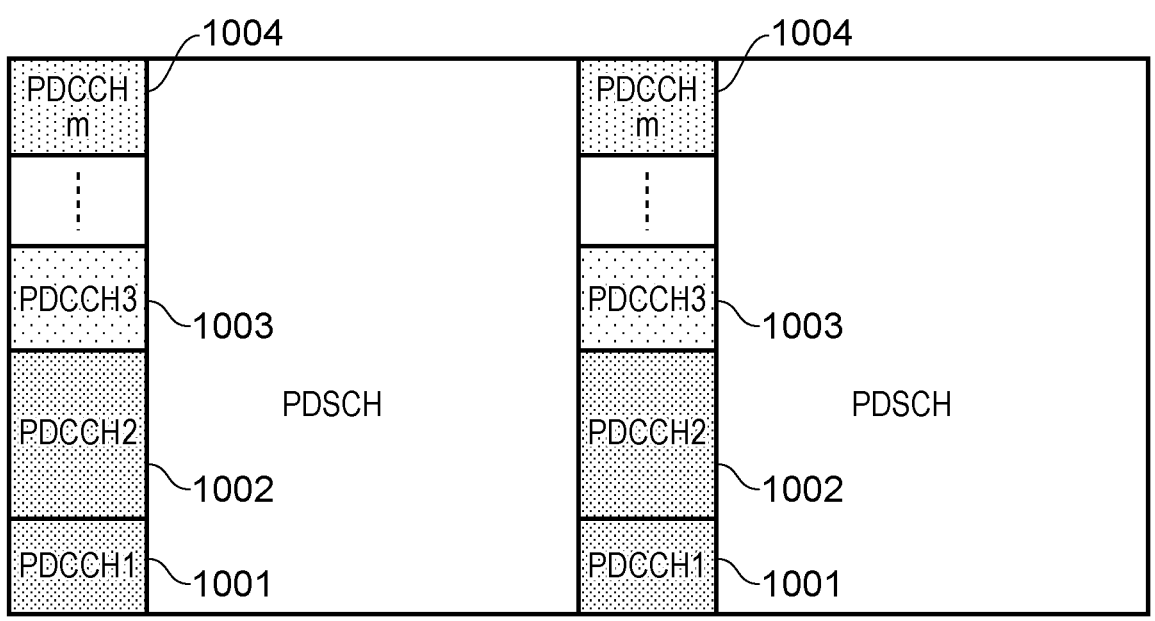
FIG. 10 provides a schematic diagram of two LTE subframe in accordance with an example of the present disclosure.

FIG. 10 provides a schematic diagram of an example embodiment where the control channel is formed from a plurality of control channel modules. This arrangement allows control channel modules to be allocated to numerous nodes and or UEs. In FIG. 10 the control channel is formed from control channel modules 1001, 1002, and 1003 and up to control channel module m 1004. Each control channel module may be allocated to different entities, for instance UEs based on their radio network temporary identifier (RNTI), and the allocation criteria broadcast in a default control channel module or provided in system specifications. Restrictions may be placed on the serving eNodeB such that control channel modules allocated for a given RNTI may only span across resource blocks with the control channel bandwidth which satisfy a function of the RNTI. For instance, control channel modules for a particular RNTI may start and span resource blocks satisfying a modulo division of the RNTI. For example, a control channel module may start in resource blocks where RNIT mod 3=0 and span a number of resource blocks where RNTI mod 3=0. Although this approach increases the restrictions on control channel module allocation and may increase complexity at the eNodeB, it may simplify the process of searching for relevant control channel modules by the UEs, thus reducing their power consumption.

In FIG. 10 the maximum number of control channel modules is limited by their minimum size e.g. in Release-11 LTE specifications six resource blocks, and the maximum allowable bandwidth of the control channel. For instance the maximum number of control channel modules may be equal to the number of Resource Blocks in Maximum Bandwidth/6 where the minimum size of a control channel module is six resource blocks. As illustrated in FIG. 10 the control channel modules may be of varying sizes such that the eNodeB can allocate larger control channel modules to UEs or nodes requiring comparatively more control channel data. Although the control channel modules may be allocated on an individual UE or node basis, a module containing common search space downlink control information may be provided which includes common control data such as paging and random access responses. The location of such a control channel module may be stated in system specifications or signalled in broadcast data such as system information blocks.

Figure 11:
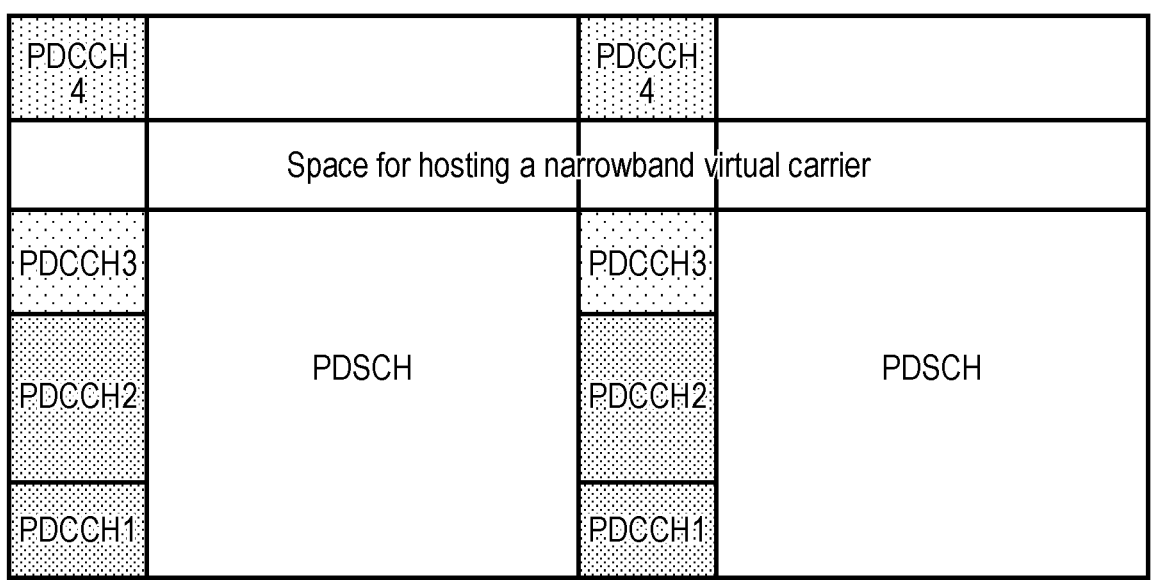
FIG. 11 provides a schematic diagram of two LTE subframe in accordance with an example of the present disclosure.

FIG. 11 provides a schematic diagram of an example embodiment where the control channel is formed from a plurality of control channel modules and a bandwidth gap in the control channel has been left in between the control channel modules for the insertion of a narrowband virtual carrier. In FIG. 11 the control channel is formed from four control channel modules 1101 to 1104 where a bandwidth gap is provided between control channel modules 1103 and 1104. In an analogous manner to that described with reference to FIG. 8, a narrowband virtual carrier then may be inserted in the bandwidth gap. Once again appropriate scheduling for the PDSCH will be also be required in order for clear space in the PDSCH to be allocated to the virtual carrier. The adaptable nature of having a plurality of independent control channel modules enables one or more virtual carriers to be inserted into any portion of the system bandwidth as opposed to a set position which cannot be varied by the eNodeB. The adaptable placement and size of the control channel modules also allows the virtual carrier to variable in size without requiring excess unused bandwidth in the control channel. For instance, a virtual carrier bandwidth may be varied between 24 and 18 resources blocks in some examples such that when the virtual carrier bandwidth is reduced to 18 blocks from 24 blocks, the control channel modules can be adapted and rearranged to utilise these extra resource blocks.

In some implementations of the preceding example embodiments a default control channel module may be provided in which the eNodeB transmits system information. These default control channel modules provide UEs with data required to initially camp-on to the cell without having to do perform blind decoding on all possible module sizes and the data contained in each module. The default control channel module may also provide information on the structure of the control channel modules including their beginning and end and the location of any blank control channel modules such that superfluous decoding and blind detection can be reduced. The location of the default control channel module may be hardcoded or signalled in broadcast system information and first acquired when camping-on to the wireless access interface. Additional control channel structure information may be signalled using the master information block where the system frame number, system bandwidth and control channel size can be indicated. Alternatively, using the PCFICH the number of control channel symbols and control channel size can be indicated.

Figure 12:
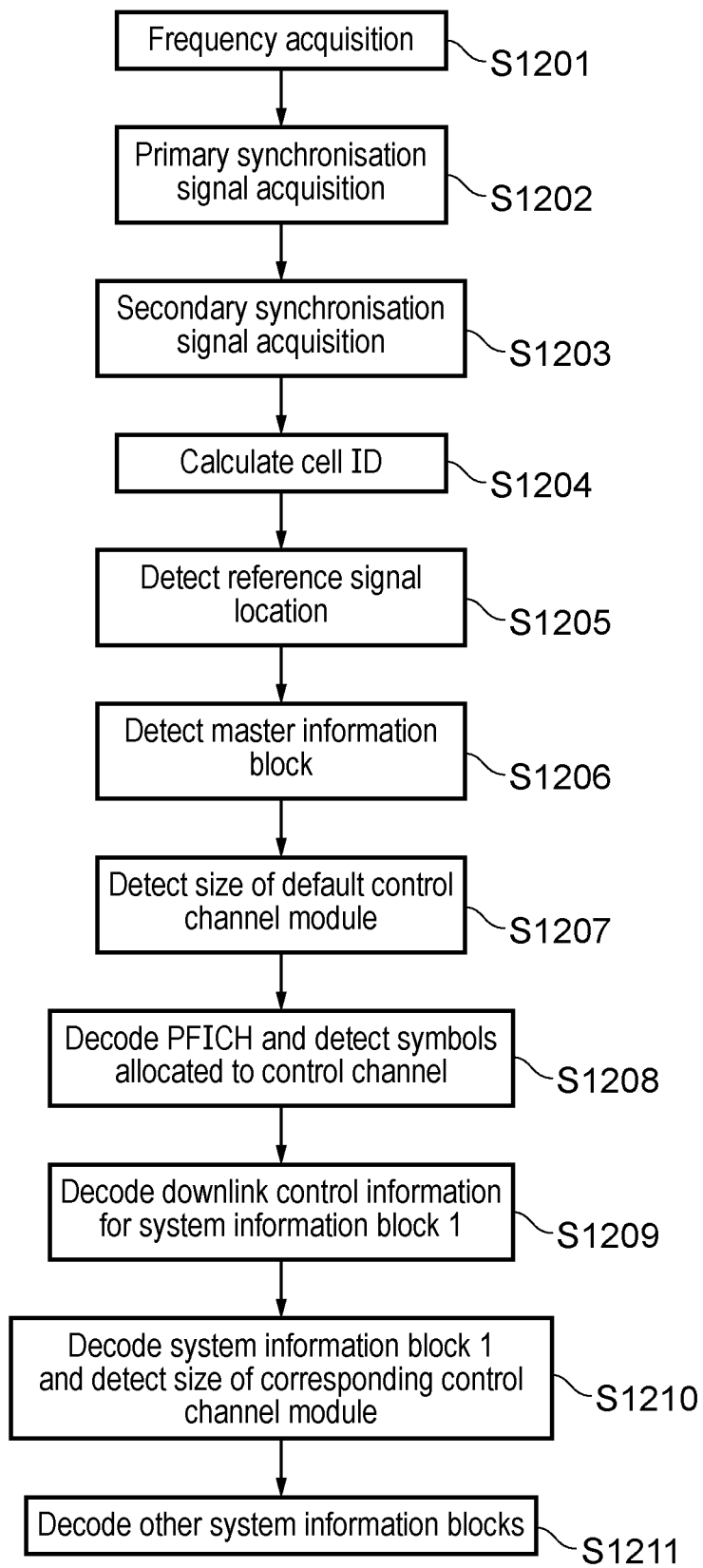
FIG. 12 provides a flow diagram of an LTE camp-on procedure in accordance with an example of the present disclosure.

FIG. 12 provides a flow diagram illustrating an example camp-on procedure of a UE and the initial stages in reception of control information when the control channel is formed from one or more control channel modules and a default control channel module is utilised to provide control channel structure information to UEs. This procedure includes the following steps at the UE S1201: Acquiring the frequency of the serving eNodeB;

S1202: Detecting the primary synchronisation signal (PSS) in order to obtain slot timing and SSS scrambling code;

S1203: Detecting the secondary synchronisation signal (SSS) in order to obtain frame timing and cell group ID sequence;

S1204: Calculating the cell ID using PSS and SSS;

S1205: Detecting the reference signal location using cell ID;

S1206: Detecting the master information block (MIB) in the PBCH;

S1207: Detecting size of the default control channel model using the MIB, system frame number and system bandwidth;

S1208: Decoding PCFICH and detecting symbols allocated to the control channel;

S1209: Decoding downlink control information for system information block 1 from default control channel module;

S1210: Decoding system information block 1 and detecting size of corresponding control channel module which includes scheduling information for other SIBs;

S1211: Decoding other system information blocks; The above procedure may include additional steps required to camp-on to an eNodeB and or some steps may be performed in a different order. For instance, it is possible that the size of the default control channel module may be detected at step S1208 instead of S1207.

Figure 13:
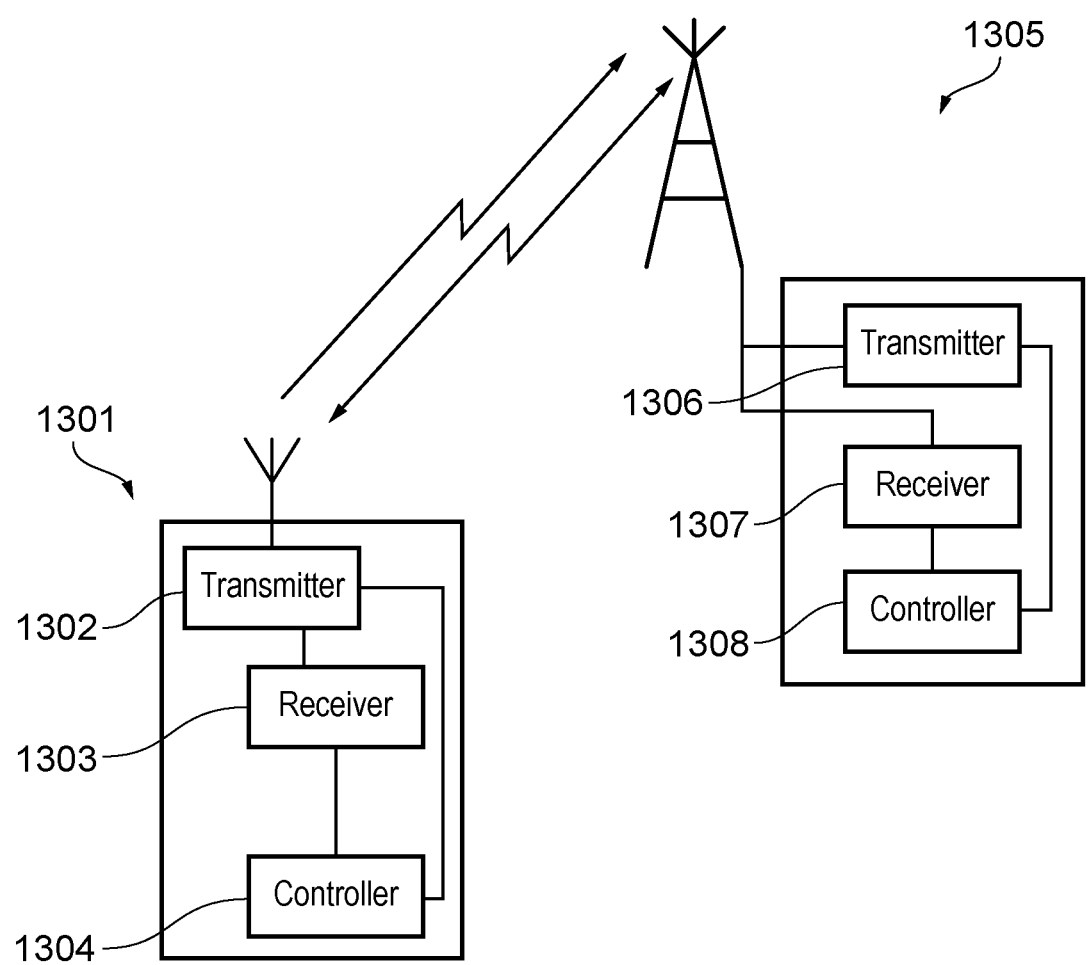
FIG. 13 provides a schematic diagram of a communications device and a network element in accordance with an example of the present disclosure.

FIG. 13 provides a schematic diagram of a UE 1301 and an eNodeB 1305 in which example embodiments of the present techniques may be implemented. The UE includes a transmitter 1302, a receiver 1303 and a controller 1304 where the controller is configured to control the receiver 1303 to detect signals representing the control data and user data transmitted by the eNodeB 1305, and to estimate the data conveyed by the signals. The controller 1304 is also configured to control the transmitter 1302 to transmit signals representing uplink data to the eNodeB. As well as detecting signals transmitted by the eNodeB 1305, the UE 1301 may also detect signals transmitted by a low-power node or other network element. The eNodeB 1305 includes a transmitter 1306, a receiver 1307 and a controller 1308, where the controller 1308 is configured to control the transmitter 1306 to transmit signals representing control data and user data to the UE 1301. The controller 1308 is also configured to control the receiver 1307 to detect signals representing user uplink data and estimate the data conveyed by these signals. The controller at the eNodeB may dynamically control the structure of the modular control channel via broadcast messages or messages contained in default control channel modules, such that the structure of the control channel can be adapted to suit the current or expected traffic conditions in the network. The eNodeB when operating as a macro cell as illustrated in FIG. 5, may communicate control data via the wireless access interface to all nodes within its coverage area but also communicate control data to the low-power node via a backhaul link for transmission. Alternatively, the low-power node may perform some or all of the scheduling tasks and transmit this control data directly to the UEs within its coverage area.

The following numbered paragraphs provide further example aspects and feature of the present technique:

Paragraph 1. A network element for forming a mobile communications network, the network element comprising
a transmitter configured to transmit signals via a wireless access interface to one or more communications devices,
a receiver configured to receive signals from the one or more communications devices via the wireless access interface, and
a controller configured to control the transmitter and the receiver to form the wireless access interface, the wireless access interface including downlink resources extending across a predetermined bandwidth and being divided in time into a plurality of frames, and to control the transmitter
to transmit control data to the communications devices in resources of a control channel, wherein the control channel is formed from a plurality of control channel modules, each control channel module being formed from a part of the predetermined bandwidth, the part of the predetermined bandwidth of each control channel module being less than the predetermined bandwidth and mutually exclusive from the parts of the predetermined bandwidths from which the other control channel modules are formed.

Paragraph 2. A network element according to paragraph 1, wherein the plurality of control channel modules each have a substantially equal time duration within the frame.

Paragraph 3. A network element according to paragraph 1 or 2, wherein at least one of the plurality of control channel modules has a time duration unequal to at least one other of the plurality of the control channel modules within the frame.

Paragraph 4. A network element according to paragraph 1, 2 or 3, wherein the network element is configured to provide the wireless access interface to communication devices within a first geographical area, and the controller is configured to control the transmitter to transmit the control data to the communications devices within the first geographical area in a control channel module from the plurality of control channel modules.

Paragraph 5. A network element according to any of paragraphs 1 to 4, wherein a bandwidth occupied by the plurality of control channel modules is less than the predetermined bandwidth, such that a difference in the bandwidth occupied by the plurality of control channel modules and the predetermined bandwidth provides a bandwidth gap, wherein the controller is configured to control the transmitter to provide a narrowband virtual carrier in the bandwidth gap.

Paragraph 6. A network element according to any of paragraphs 1 to 5, wherein the controller is configured to allocate each of the control channel modules to communications devices in dependence upon an identity of each of the communications devices.

Paragraph 7. A network element according to any of paragraphs 1 to 6, wherein the controller is configured to control the transmitter to provide in a predetermined one of the plurality of control modules an indication of the bandwidth and the location of each of the plurality of the other control channel modules.

Paragraph 8. A communications device for communicating with a network element of a communications network, the network element configured to provide a wireless access interface to the communications device, the communications device comprising
a transmitter configured to transmit uplink signals to the network element via the wireless access interface,
a receiver configured to receive downlink signals from the network element via the wireless access interface via downlink resources of the wireless access interface, the wireless access extending across a predetermined bandwidth and being divided in time into a plurality of frames, and
a controller configured to control the receiver
to detect control data transmitted by the network element in a control channel of the wireless access interface, wherein the control channel is formed from a plurality of control channel modules, each control channel module being formed from a part of the predetermined bandwidth, the part of the predetermined bandwidth of each control channel module being less than the predetermined bandwidth and mutually exclusive from the parts of the predetermined bandwidths from which the other control channel modules are formed.

Paragraph 9. A communications device according to paragraph 8, wherein a predetermined control channel module provides an indication of the bandwidth and the location of each of the plurality of the other control channel modules and the controller is configured to control the receiver to detect the indication from the predetermined control channel and to detect the control data from another control channel module of the plurality of control channel modules based on the indication.

Paragraph 10. A communications system comprising a mobile communications network and a communications device for communicating via the mobile communications network, the mobile communications network including
a network element configured to transmit signals using a transmitter via a wireless access interface to the communications device, to receive signals using a receiver from the communications device via the wireless access interface, and to control the transmitter and the receiver to form the wireless access interface, the wireless access interface including downlink resources extending across a predetermined bandwidth and being divided in time into a plurality of frames, and to control the transmitter
to transmit control data to the communications device in resources of a control channel, wherein the control channel is formed from f a plurality of control channel modules, each control channel module being formed from a part of the predetermined bandwidth, the part of the predetermined bandwidth of each control channel module being less than the predetermined bandwidth and mutually exclusive from the parts of the predetermined bandwidths from which the other control channel modules are formed.

Paragraph 11. A communications system according to paragraph 10, wherein the plurality of control channel modules each have a substantially equal time duration within the frame.

Paragraph 12. A communications system according to paragraph 10 or 11, wherein at least one of the plurality of control channel modules has a time duration unequal to at least one other of the plurality of the control channel modules within the frame.

Paragraph 13. A communications system according to paragraph 10, 11 or 12, wherein the network element is configured to provide the wireless access interface to the communication device within a first area, and the controller is configured to control the transmitter to transmit the control data to the communications device within the first area in the control channel module from the plurality of control channel modules.

Paragraph 14. A communications system according to paragraph 10, 11, 12, or 13, wherein a bandwidth occupied by the plurality of control channel modules is less than the predetermined bandwidth, such that a difference in the bandwidth occupied by the plurality of control channel modules and the predetermined bandwidth provides a bandwidth gap during the predetermined time period, wherein the controller is configured to control the transmitter to provide a narrowband virtual carrier within the bandwidth gap.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The invention claimed is:

1. A network element for forming a mobile communications network, the network element comprising
a transmitter configured to transmit signals via a wireless access interface to one or more communications devices,
a receiver configured to receive signals from the one or more communications devices via the wireless access interface, and
a controller configured to:
control the transmitter and the receiver to form the wireless access interface using control channel resources of a control channel, the control channel resources extending across a predetermined bandwidth in a frequency domain and being divided in time into a plurality of subframes, and
control the transmitter to transmit control data to the communications devices using the control channel resources,
wherein the control channel resources include a plurality of control channel modules, each control channel module being formed from a part of the predetermined bandwidth, the part of the predetermined bandwidth of each control channel module being less than the predetermined bandwidth and mutually exclusive from other parts of the predetermined bandwidths from which other control channel modules are formed, and the controller is configured to dynamically control a size of the part of the predetermined bandwidth of each control channel module based on current or expected traffic conditions of the mobile communications network.

2. A network element as claimed in claim 1, wherein the plurality of control channel modules each have a substantially equal time duration within the subframe.

3. A network element as claimed in claim 1, wherein at least one of the plurality of control channel modules has a time duration unequal to at least one other of the plurality of the control channel modules within the subframe.

4. A network element as claimed in claim 1, wherein the network element is configured to provide the wireless access interface to communication devices within a first geographical area, and the controller is configured to control the transmitter to transmit the control data to the communications devices within the first geographical area in a control channel module from the plurality of control channel modules.

5. A network element as claimed in claim 1, wherein a bandwidth occupied by the plurality of control channel modules is less than the predetermined bandwidth, such that a difference in the bandwidth occupied by the plurality of control channel modules and the predetermined bandwidth provides a bandwidth gap, wherein the controller is configured to control the transmitter to provide a narrowband virtual carrier in the bandwidth gap.

6. A network element as claimed in claim 1, wherein the controller is configured to allocate each of the control channel modules to communications devices in dependence upon an identity of each of the communications devices.

7. A network element as claimed in claim 1, wherein the controller is configured to control the transmitter to provide in a predetermined one of the plurality of control modules an indication of the bandwidth and the location of each of the plurality of the other control channel modules.

8. A network element as claimed in claim 1, wherein the controller is configured to dynamically control a location of each control channel module.

9. A communications device for communicating with a network element of a communications network, the network element configured to provide a wireless access interface to the communications device, the communications device comprising a transmitter configured to transmit uplink signals to the network element via the wireless access interface, a receiver configured to receive downlink signals from the network element via the wireless access interface using control channel resources of a control channel, the control channel resources extending across a predetermined bandwidth in a frequency domain and being divided in time into a plurality of subframes, and a controller configured to control the receiver to detect control data transmitted by the network element using control channel resources, wherein the control channel resources include a plurality of control channel modules, each control channel module being formed from a part of the predetermined bandwidth, the part of the predetermined bandwidth of each control channel module being less than the predetermined bandwidth and mutually exclusive from other parts of the predetermined bandwidths from which other control channel modules are formed, and the controller is configured to dynamically control a size of the part of the predetermined bandwidth of each control channel module based on current or expected traffic conditions of the communications network.

10. A communications device as claimed in claim 9, wherein a predetermined control channel module provides an indication of the bandwidth and the location of each of the plurality of the other control channel modules and the controller is configured to control the receiver to detect the indication from the predetermined control channel and to detect the control data from another control channel module of the plurality of control channel modules based on the indication.

11. A communications device as claimed in claim 9, wherein the controller is configured to dynamically control a location of each control channel module.

12. A communications system comprising a mobile communications network and a communications device for communicating via the mobile communications network, the mobile communications network including a network element configured to transmit signals using a transmitter via a wireless access interface to the communications device, to receive signals using a receiver from the communications device via the wireless access interface, and to control the transmitter and the receiver to form the wireless access interface using control channel resources of a control channel, the control channel resources extending across a predetermined bandwidth in a frequency domain and being divided in time into a plurality of subframes, and to control the transmitter to transmit control data to the communications device using the control channel resources, wherein the control channel resources include a plurality of control channel modules, each control channel module being formed from a part of the predetermined bandwidth, the part of the predetermined bandwidth of each control channel module being less than the predetermined bandwidth Id mutually exclusive from other parts of the predetermined bandwidths from which other control channel modules are formed, and to dynamically control a size of the part of the predetermined bandwidth of each control channel module based on current or expected traffic conditions of the mobile communications network.

13. A communications system as claimed in claim 12, wherein the plurality of control channel modules each have a substantially equal time duration within the subframe.

14. A communications system as claimed in claim 12, wherein at least one of the plurality of control channel modules has a time duration unequal to at least one other of the plurality of the control channel modules within the subframe.

15. A communications system as claimed in claim 12, wherein the network element is configured to provide the wireless access interface to the communication device within a first area, and is configured to control the transmitter to transmit the control data to the communications device within the first area in the control channel module from the plurality of control channel modules.

16. A communications system as claimed in claim 12, wherein a bandwidth occupied by the plurality of control channel modules is less than the predetermined bandwidth, such that a difference in the bandwidth occupied by the plurality of control channel modules and the predetermined bandwidth provides a bandwidth gap during the predetermined time period, wherein the network element is configured to control the transmitter to provide a narrowband virtual carrier within the bandwidth gap.

17. A communications system as claimed in claim 12, wherein the network element is configured to dynamically control a location of each control channel module.

18. A method of communicating via a mobile communications network, comprising
 transmitting signals via a wireless access interface to one or more communications devices,
 receiving signals from the one or more communications devices via the wireless access interface, and
 controlling the transmitting and the receiving to form the wireless access interface using control channel resources of a control channel, the control channel resources extending across a predetermined bandwidth in a frequency domain and being divided in time into a plurality of timeframes, and the control the transmitting includes
 transmitting control data to the communications devices using the control channel resources, wherein the control channel resources include a plurality of control channel modules, each control channel module being formed from a part of the predetermined bandwidth, the part of the predetermined bandwidth of each control channel module being less than the predetermined bandwidth and mutually exclusive from other parts of the predetermined bandwidths from which other control channel modules are formed and
 dynamically controlling a size of the part of the predetermined bandwidth of each control channel module based on current or expected traffic conditions of the mobile communications network.

19. Circuitry for a network element for forming a mobile communications network, the circuitry comprising
 transmitter circuitry configured to transmit signals via a wireless access interface to one or more communications devices,
 receiver circuitry configured to receive signals from the one or more communications devices via the wireless access interface, and
 controller circuitry configured to control the transmitter and the receiver to form the wireless access interface using control channel resources of a control channel, the control channel resources extending across a predetermined bandwidth in a frequency domain and being divided in time into a plurality of frames, and to control the transmitter circuitry
 to transmit control data to the communications devices using the control channel resources,
 wherein the control channel resources include a plurality of control channel modules, each control channel module being formed from a part of the predetermined bandwidth, the part of the predetermined bandwidth of each control channel module being less than the predetermined bandwidth and mutually exclusive from other parts of the predetermined bandwidths from which other control channel modules are formed and
 the controller circuitry is configured to dynamically control a size of the part of the predetermined bandwidth of each control channel module based on current or expected traffic conditions of the mobile communications network.

20. Circuitry for communicating with a network element of a communications network, the network element configured to provide a wireless access interface to a communications device, the circuitry comprising
 transmitter circuitry configured to transmit uplink signals to the network element via the wireless access interface,
 receiver circuitry configured to receive downlink signals from the network element via the wireless access interface using control channel resources of a control channel, the control channel resources extending across a predetermined bandwidth and being divided in time into a plurality of subframes, and
 controller circuitry configured to control the receiver circuitry
 to detect control data transmitted by the network element using the control channel resources, wherein the control channel resources include a plurality of control channel modules, each control channel module being formed from a part of the predetermined bandwidth, the part of the predetermined bandwidth of each control channel module being less than the predetermined bandwidth and mutually exclusive from other parts of the predetermined bandwidths from which other control channel modules are formed and
 the controller circuitry is configured to dynamically control a size of the part of the predetermined bandwidth of each control channel module based on current or expected traffic conditions of the communications network.

\* \* \* \* \*